US009893358B2

(12) United States Patent
Jeong et al.

(10) Patent No.: US 9,893,358 B2
(45) Date of Patent: Feb. 13, 2018

(54) BINDER COMPOSITION FOR RECHARGEABLE LITHIUM BATTERY, METHOD OF PREPARING THE SAME, AND RECHARGEABLE LITHIUM BATTERY INCLUDING THE SAME

(71) Applicant: SAMSUNG SDI CO., LTD., Yongin-si, Gyeonggi-do (KR)

(72) Inventors: Chang-Ui Jeong, Yongin-si (KR); Byung-Joo Chung, Yongin-si (KR); Nam-Seon Kim, Daejeon-si (KR); Yang-soo Kim, Daejeon-si (KR); Kwang-Sik Choi, Daejeon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 56 days.

(21) Appl. No.: 14/474,038

(22) Filed: Aug. 29, 2014

(65) Prior Publication Data

US 2015/0118556 A1 Apr. 30, 2015

(30) Foreign Application Priority Data

Oct. 29, 2013 (KR) .......................... 10-2013-0129580

(51) Int. Cl.
*H01M 4/62* (2006.01)
*H01M 4/38* (2006.01)
*H01M 4/134* (2010.01)
*H01M 4/131* (2010.01)

(52) U.S. Cl.
CPC ........... *H01M 4/622* (2013.01); *H01M 4/134* (2013.01); *H01M 4/131* (2013.01); *H01M 4/386* (2013.01)

(58) Field of Classification Search
CPC .... H01M 10/052; H01M 4/134; H01M 4/386; H01M 4/622; H01M 4/62; H01M 4/38
See application file for complete search history.

(56) References Cited

U.S. PATENT DOCUMENTS

| 7,875,388 B2 | 1/2011 | Le | |
|---|---|---|---|
| 2007/0020525 A1* | 1/2007 | Kim | H01M 2/145 429/251 |
| 2007/0048602 A1* | 3/2007 | Kim | H01M 2/166 429/144 |

(Continued)

FOREIGN PATENT DOCUMENTS

| JP | 2006-196339 A | 7/2006 |
|---|---|---|
| JP | 2009-080971 A | 4/2009 |

(Continued)

OTHER PUBLICATIONS

"Lithium polyacrylate as a binder for tin-cobalt-carbon negative electrodes in lithium-ion batteries", Jing Li et al., Electrochimica Acta 55, 2991-2995, Jan. 15, 2010.*

(Continued)

*Primary Examiner* — Kenneth J Douyette
(74) *Attorney, Agent, or Firm* — Lewis Roca Rothgerber Christie LLP

(57) ABSTRACT

A binder composition for a rechargeable lithium battery, a method of preparing the same, and a rechargeable lithium battery including the same. The binder composition includes lithium polyacrylate and a solvent and has a viscosity of about 500 cps to about 5000 cps.

9 Claims, 1 Drawing Sheet

(56) References Cited

U.S. PATENT DOCUMENTS

| | | | | |
|---|---|---|---|---|
| 2008/0187838 | A1* | 8/2008 | Le | H01M 4/134 429/231.95 |
| 2008/0199778 | A1* | 8/2008 | Hirata | H01M 4/136 429/231.8 |
| 2009/0053589 | A1* | 2/2009 | Obrovac | H01M 4/134 429/149 |
| 2009/0111031 | A1* | 4/2009 | Hirose | H01M 4/134 429/332 |
| 2011/0086268 | A1* | 4/2011 | Le | H01M 4/134 429/217 |
| 2011/0129735 | A1* | 6/2011 | Yokoi | H01M 4/485 429/231.2 |
| 2012/0094178 | A1* | 4/2012 | Loveridge | H01M 4/134 429/217 |
| 2012/0282522 | A1* | 11/2012 | Axelbaum | B82Y 30/00 429/219 |
| 2013/0157136 | A1* | 6/2013 | Balicki | C09J 109/06 429/223 |

FOREIGN PATENT DOCUMENTS

| | | |
|---|---|---|
| JP | 2012-234703 A | 11/2012 |
| KR | 10-2009-0109570 | 10/2009 |

OTHER PUBLICATIONS

Machine English Translation of JP 2006-196339 A, 20 pages, Jul. 27, 2006.

Machine English Translation of JP 2009-080971 A, 19 pages, Apr. 16, 2009.

Machine English Translation of JP 2012-234703 A, 24 pages, Nov. 29, 2012.

KIPO Office Action dated Oct. 27, 2016, for corresponding Korean Patent Application No. 10-2013-0129580 (9 pages).

Li, Jing et al., "Lithium polyacrylate as a binder for tin-cobalt-carbon negative electrodes in lithium-ion batteries," Electrochimica Acta, vol. 55, Issue 8, Mar. 2010, 1 page.

KIPO Notice of Allowance dated Apr. 14, 2017, for corresponding Korean Patent Application No. 10-2013-0129580 (5 pages).

* cited by examiner

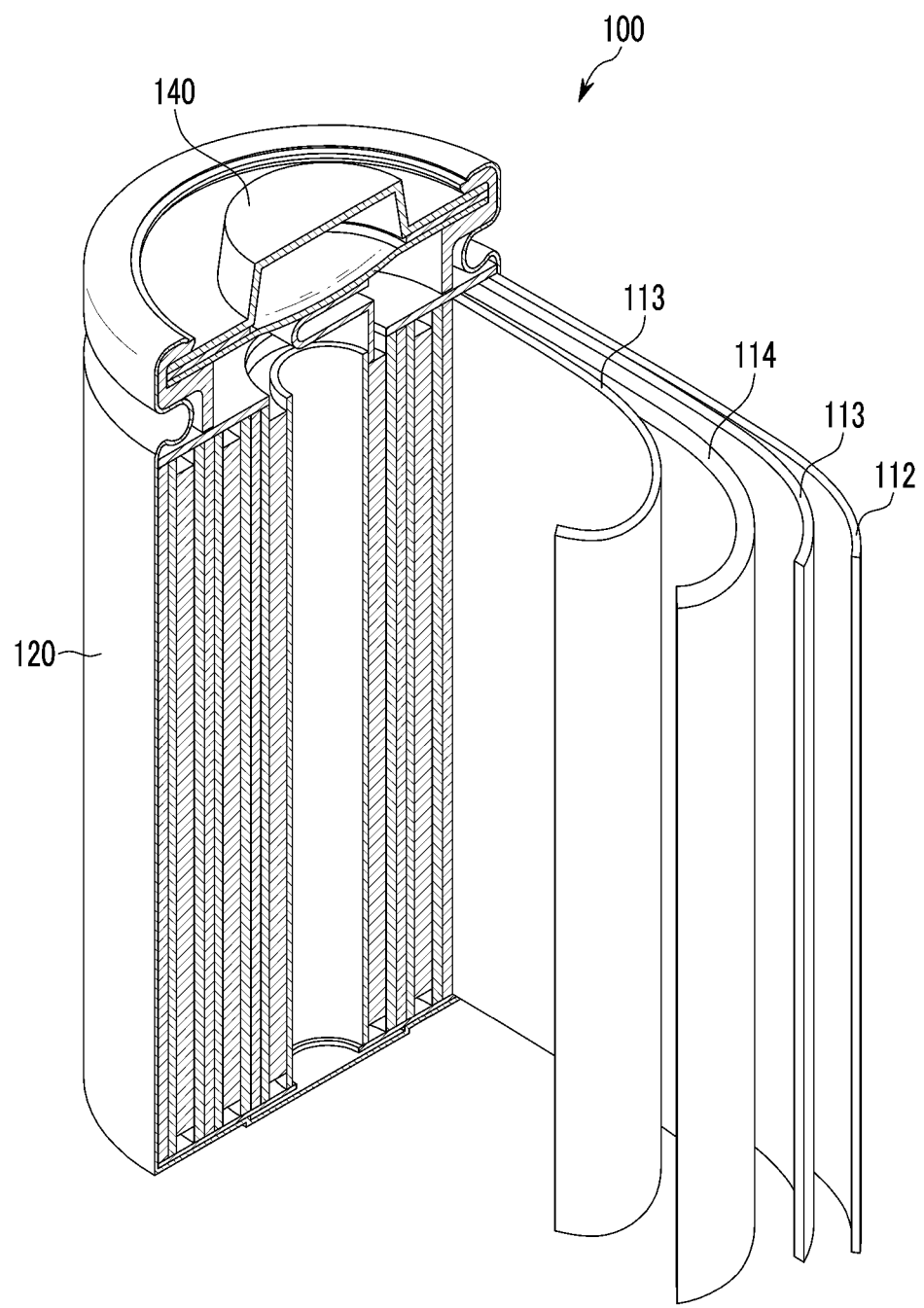

US 9,893,358 B2

BINDER COMPOSITION FOR RECHARGEABLE LITHIUM BATTERY, METHOD OF PREPARING THE SAME, AND RECHARGEABLE LITHIUM BATTERY INCLUDING THE SAME

CROSS-REFERENCE TO RELATED APPLICATION

This application claims priority to and the benefit of Korean Patent Application No. 10-2013-0129580, filed in the Korean Intellectual Property Office on Oct. 29, 2013, the entire content of which is incorporated herein by reference.

BACKGROUND

1. Field

The following description relates to a binder composition for a rechargeable lithium battery, a method of preparing the same, and a rechargeable lithium battery including the same.

2. Description of the Related Art

A rechargeable lithium battery includes positive and negative electrodes (each including a material that can reversibly intercalate/deintercalate lithium ions as the respective positive and negative active materials) and an organic electrolyte solution or a polymer electrolyte solution infused (charged) between the positive and negative electrodes. Herein, the positive and negative electrodes intercalate and deintercalate lithium ions and produce electrical energy through oxidation and reduction reactions.

As for a positive active material for a lithium rechargeable battery, a lithium-transition metal oxide capable of intercalating lithium (such as $LiCoO_2$, $LiMn_2O_4$, $LiNi_{1-x}Co_xO_2$ (0<x<1), or the like) has been used (i.e., utilized). As for a negative active material for a lithium rechargeable battery, various carbon-based materials (such as artificial graphite, natural graphite, or hard carbon) capable of intercalating and deintercalating lithium ions have been used. Recently, the demand for a battery having high energy density increasingly has required a negative active material having high theoretical capacity density.

Accordingly, Si, Sn, and Ge alloyed with lithium, an oxide thereof, and an alloy thereof have drawn attention as possible materials for a negative active material. In particular, a Si-based negative active material has very high charge capacity and is widely applied to a high-capacity battery. However, the Si-based negative active material may be about 300% to about 400% expanded during the charge and discharge cycles. Therefore, there is a need for a binder capable of controlling the expansion of the Si-based negative active material effectively.

SUMMARY

An aspect of one or more embodiments of the present invention is directed toward a binder composition for a rechargeable lithium battery that endures the volume expansion of an active material effectively and has improved dispersibility, stability and coating properties. Another aspect of one or more embodiments of the present invention is directed toward a method of preparing the binder composition.

Another aspect of one or more embodiments of the present invention is directed toward a rechargeable lithium battery having improved initial efficiency and cycle-life characteristics.

In one embodiment of the present invention, a binder composition for a rechargeable lithium battery includes lithium polyacrylate and a solvent, and the binder composition has a viscosity of about 500 cps to about 5000 cps.

The viscosity may be about 600 cps to about 2000 cps.

The binder composition may include lithium polyacrylate of about 15 wt % to about 30 wt % and the solvent of 70 wt % to 85 wt %, and in another embodiment, the binder composition may include lithium polyacrylate of about 15 wt % to 20 wt % and the solvent of 80 wt % to 85 wt %. Furthermore, the binder composition for a rechargeable lithium battery may further include polyacrylate. Herein, the binder composition may include 15 wt % to 30 wt % of lithium polyacrylate, more than 0 wt % and 5 wt % or less of polyacrylate, and 65 wt % or more and less than 85 wt % of the solvent.

The binder composition for a rechargeable lithium battery may further include lithium cations of more than 1 part by mole and 10 parts by mole based on 100 parts by mole of an anion repeating unit of polyacrylate.

A polydispersity index (PDI; $M_w/M_n$) of the binder composition may be about 1 to about 4.

The binder composition may have a pH of about 6 to about 8.5.

The binder composition may have a turbidity of about 3 NTU to about 20 NTU.

A color value of the binder composition measured according to ASTM D 1209 using (i.e., utilizing) a platinum-cobalt color measuring equipment may be about 80 to about 200.

In another embodiment of the present invention, a rechargeable lithium battery includes an electrode including a current collector and an active material layer on the current collector; and an electrolyte, wherein the active material layer includes an active material and the binder composition described above.

The active material may include Si, $SiO_x$, a Si—C composite, a Si-Q alloy, graphite, or a combination thereof. Herein, x is (satisfies) 0<x<2, and Q is an alkali metal, an alkaline-earth metal, a Group 13 to 16 element, a transition metal, a rare earth element, or a combination thereof, but not Si.

The binder composition may be included in an amount of about 1 wt % to about 50 wt % based on the total amount of the active material layer.

In yet another embodiment of the present invention, a method of preparing a binder composition for a rechargeable lithium battery includes mixing an acrylic acid monomer and a lithium-containing compound liquid; obtaining a lithium acrylate monomer; polymerizing the lithium acrylate monomer to obtain a lithium polyacrylate.

In mixing an acrylic acid monomer and a lithium-containing compound, the lithium-containing compound may be mixed in an amount of about 95 parts by mole to about 110 parts by mole based on 100 parts by mole of the acrylic acid monomer.

The lithium-containing compound may be lithium hydroxide, a lithium salt, or a combination thereof.

In the obtained binder composition, an amount of lithium polyacrylate may be about 10 wt % to about 30 wt %.

The obtained binder composition may have a viscosity of about 500 cps to about 5000 cps.

The obtained lithium polyacrylate may have a polydispersity index (PDI; $M_w/M_n$) of about 1 to about 4.

The obtained lithium polyacrylate may have a turbidity of about 3 NTU to about 20 NTU.

A color value of the obtained lithium polyacrylate measured according to ASTM D 1209 using a platinum-cobalt color measuring equipment may be about 80 to about 200.

The binder composition for a rechargeable lithium battery according to one embodiment endures the volume expansion of an active material effectively and has improved dispersibility, stability, and coating properties.

The rechargeable lithium battery according to one embodiment has improved performance such as initial efficiency and cycle-life characteristics and the like.

BRIEF DESCRIPTION OF THE DRAWING

FIG. 1 is a schematic view of a rechargeable lithium battery according to one embodiment of the present invention.

DETAILED DESCRIPTION

Hereinafter, embodiments of the present invention are illustrated in more detail. However, these embodiments are examples, and this disclosure is not limited thereto.

In one embodiment of the present invention, a binder composition for a rechargeable lithium battery including lithium polyacrylate and a solvent, having a viscosity of about 500 cps to about 5000 cps at a room temperature (about 25° C.) is provided.

The binder composition satisfying the above properties can well endure the volume expansion of an active material and also has improved dispersibility, stability and coating properties. The rechargeable lithium battery including the same has improved charge and discharge characteristics, and cycle-life characteristics.

The lithium polyacrylate is a polymer including a repeating unit represented by the following Chemical Formula 1.

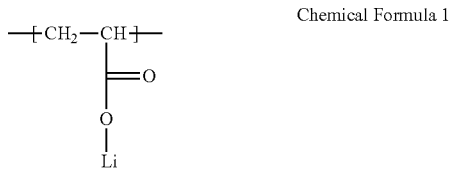

Chemical Formula 1

The binder composition for a rechargeable lithium battery may include 15 wt % to 30 wt % of lithium polyacrylate and 70 wt % to 85 wt % of a solvent, and specifically, 15 wt % to 20 wt % of lithium polyacrylate and 80 wt % to 85 wt % of the solvent. Furthermore, the binder composition for a rechargeable lithium battery may further include polyacrylate. Herein, the binder composition may include 15 wt % to 30 wt % of lithium polyacrylate, more than 0 wt % and 5 wt % or less of polyacrylate, and 65 wt % or more and less than 85 wt % of the solvent.

The amount of lithium polyacrylate may be measured after drying the obtained binder composition during the binder composition preparation at 150° C. for 1 hour, and is measured as a ratio of the weight of the lithium polyacrylate sample after drying to that before drying and then converting to a percent (%).

The amount of the lithium polyacrylate may be, for example, in a range of about 15 wt % to about 30 wt %, about 15 wt % to about 20 wt %, about 10 wt % to about 25 wt %, or about 10 wt % to about 20 wt %. The amount of the solvent may be suitably controlled depending on the amount of lithium polyacrylate.

In the case of including polyacrylate, the amount of polyacrylate may be more than 0 wt % and 5 wt % or less; more than 0 wt % and 4 wt % or less; more than 0 wt % and 3 wt % or less; more than 0 wt % and 2 wt % or less. In the binder composition further including polyacrylate, the amount of the solvent may be suitably controlled depending on the amounts of polyacrylate and lithium polyacrylate.

The viscosity may be measured by using a Brookfield viscometer and setting a spindle at #3 or #4 at a speed of 30 rpm to 200 rpm.

The binder composition may have a viscosity ranging from, for example, about 500 cps to about 1500 cps at 25° C., about 500 cps to about 1000 cps at 25° C., about 600 cps to about 2000 cps at 25° C., about 600 cps to about 1500 cps at 25° C., or about 600 cps to about 1000 cps at 25° C.

According to one embodiment, the binder composition has a higher content of lithium polyacrylate, but a relatively lower viscosity than conventional binder composition. Accordingly, dispersibility and stability as well as coating properties of the binder composition may be improved. Charge and discharge efficiency and cycle-life characteristics of a rechargeable lithium battery including the same may be improved.

The binder composition may include lithium cations ($Li^+$) of more than 1 part by mole and 10 parts by mole or less based on 100 parts by mole of an anion repeating unit ($*$—$CH_2CH(COO$—$^-)$-$*$) of polyacrylate. Accordingly, charge and discharge and cycle-life characteristics of a rechargeable lithium battery including the binder composition may be improved.

The binder composition may have a polydispersity index (PDI; $M_w/M_n$) of about 1 to about 4. Herein, the binder composition including the lithium polyacrylate has excellent dispersibility, stability, and coating properties.

The polydispersity index is a ratio of $M_w$ relative to $M_n$, the $M_w$ is a weight average molecular weight, and the $M_n$ is a number average molecular weight. The $M_n$ and $M_w$ are measured by using (i.e., utilizing) a Waters GPC system (Column: 2× TSKgel, GMPWxl 7.8×300 mm) and utilizing polyethylene glycol/polyethylene oxide as a standard sample.

As the polydispersity index is closer to 1, the molecular weights have a narrower dispersion. In other words, the molecular weights are more uniform.

A polydispersity index of the binder composition may be, for example, about 1 to about 3.5, about 2 to about 4, or about 2 to about 3.5.

In this way, binder composition according to one embodiment has a polydispersity index closer to 1 than a commercially available binder composition, and thus, the molecular weights are more uniformly dispersed. Accordingly, the binder composition has excellent dispersibility, stability, and coating properties. A rechargeable lithium battery including the same has excellent charge and discharge efficiency, cycle-life characteristics, and the like.

The lithium polyacrylate has no particular limit in a weight average molecular weight ($M_w$) and a number average molecular weight ($M_n$). For example, the lithium polyacrylate may have a weight average molecular weight ($M_w$) ranging from about 80,000 g/mol to about 200,000 g/mol and a number average molecular weight ($M_n$) ranging from about 20,000 g/mol to about 100,000 g/mol.

The binder composition may have a pH of about 6 to about 8.5. For example, the pH may be in a range of about 7 to about 8.5, about 7.5 to about 8.5, or about 8 to about 8.5. Herein, the binder composition may well endure the expansion of an active material and have excellent stability and coating properties. The pH may be measured by a pH measurement device generally used in a related art of the present invention.

The binder composition may have a turbidity of about 3 NTU to about 20 NTU. For example, the turbidity may be in a range of about 3 to about 15 NTU, about 5 to about 20 NTU, or about 5 to about 15 NTU.

The turbidity is measured by using a TB1000 turbidimeter made by EUTECH Instruments.

The binder composition may have a color value ranging from about 80 to about 200. For example, the color value may be in a range of about 80 to about 170, about 80 to about 150, or about 90 to about 150.

The color value is measured by using a platinum-cobalt color measuring equipment with a reference to ASTM D 1209.

The binder composition has a color near to (close to) light yellow, when examined with naked eyes.

The above binder composition with lithium polyacrylate has different properties from those of commercially available binder composition. When the binder composition having properties within the range as described above, dispersibility, stability and coating properties are improved, and accordingly, charge and discharge efficiency, cycle-life characteristics, and the like of a rechargeable lithium battery are improved. A method of preparing lithium polyacrylate having the properties will be described later.

The solvent may be an organic solvent (for example, alcohol), or an aqueous solvent (such as water), or the like. In other words, the binder composition may include the aqueous solvent and thus, is environmentally-friendly.

The binder composition may include only the lithium polyacrylate but no other binder materials. The lithium polyacrylate may show sufficient bonding properties.

Alternatively, the binder composition may further include other binder materials besides the lithium polyacrylate.

The other binder materials may be, for example, polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, or nylon. In this case, adherence (adhesion) of the binder composition may be more improved.

In another embodiment of the present invention, a method of preparing a binder composition for a rechargeable lithium battery includes mixing an acrylic acid monomer and a lithium-containing compound liquid; obtaining a lithium acrylate monomer; polymerizing the lithium acrylate monomer to obtain a lithium polyacrylate.

In a conventional method of polymerizing the acrylic acid monomer to first synthesize polyacrylic acid (PAA) and then substitute it with lithium, a binder composition with the obtained product has unsatisfactory dispersibility and may not form a stable coating layer. Accordingly, charge and discharge efficiency and cycle-life characteristics of a rechargeable lithium battery are deteriorated.

The method of one embodiment may provide a binder composition having excellent dispersibility, stability, and coating properties. Also, charge and discharge efficiency and cycle-life characteristics of a rechargeable lithium battery including the binder composition may be improved.

Hereinafter, the method of preparing a binder composition will be illustrated in more detail. An acylic acid monomer is mixed with a lithium-containing compound. In the process of mixing an acrylic acid monomer and a lithium-containing compound, the lithium-containing compound may be mixed in an amount of about 95 to about 110 parts by mole (e.g., of lithium), for example, about 96 to about 110 parts by mole, about 97 to about 110 parts by mole, about 98 to about 110 parts by mole, or about 99 to about 110 parts by mole, based on 100 parts by mole of the acrylic acid monomer.

In the lithium acrylate liquid, a solvent may be water, ethanol, methanol, or a combination thereof.

The mixing step may be performed at a temperature of about 60° C. to 95° C.

The lithium-containing compound may include any suitable material capable of releasing lithium cations in a solvent without a particular limit. The lithium-containing compound may be, for example, lithium hydroxide, a lithium salt, or a combination thereof.

From the mixing step, a lithium acrylate monomer may be obtained.

Thereafter, the lithium acrylate monomer is polymerized to obtain a lithium polyacrylate. The polymerization may be performed by adding a polymerization initiator such as ammonium persulfate, sodium persulfate, potassium persulfate, or a combination thereof, to the monomer. The amount of the polymerization initiator is not limited, as long as it is sufficient to initiate the polymerization of the lithium acrylate monomer, but specifically, about 0.1 parts by weight to 1.0 part by weight based on the 100 parts by weight of the acylate monomer. Furthermore, the polymerization initiator may be used in the form of a solution in which the initiator is dissolved in a solvent, and the solvent may be water, ethanol, methanol, or a combination thereof.

The preparation method may provide a binder composition having a high solid content, i.e, the amount of lithium polyacrylate. For example, in the binder composition, the amount of the obtained lithium polyacrylate may be in a range of about 10 wt % to about 30 wt %, about 15 wt % to about 30 wt %, about 15 wt % to about 20 wt %, about 10 wt % to about 25 wt %, or about 10 wt % to about 20 wt %.

In addition, the manufacturing method may provide a binder composition having relatively low viscosity. For example, the obtained binder composition may have a viscosity ranging from about 500 cps to about 5000 cps at 25° C., about 500 cps to about 4000 cps at 25° C., about 500 cps to about 3000 cps at 25° C., about 600 cps to about 5000 cps at 25° C., about 600 cps to about 4000 cps at 25° C., about 600 cps to about 3000 cps at 25° C., or about 600 cps to about 2000 cps at 25° C.

In this way, the preparation method may provide a binder composition having a high solid content and a relatively low viscosity and thus, improve the dispersion and stability and coating properties of the composition. Accordingly, charge and discharge efficiency and cycle-life characteristics of a rechargeable lithium battery may be improved.

According to the preparation method, lithium polyacrylate having a high lithium substitution ratio may be prepared. For example, the obtained lithium polyacrylate may have a lithium substitution ratio ranging from about 95% to about 110%, about 96% to about 110%, about 97% to about 110%, about 98% to about 110%, or about 99% to about 110%. In other words, the lithium polyacrylate may include a lithium ion ($Li^+$) in an amount of about 95 parts by mole to about 110 parts by mole, for example, about 96 parts by mole to about 110 parts by mole, about 97 parts by mole to about 110 parts by mole, about 98 parts by mole to about 110 parts by mole, or about 99 parts by mole to about 110 parts by mole, based on 100 parts by mole of an anion repeating unit (*—$CH_2CH(COO—^-)$-*) of polyacrylate.

The lithium substitution ratio of less than 100% indicates that the binder composition further includes polyacrylate. Accordingly, the binder composition according to one embodiment may include more than 1 part by mole to 10 parts by mole or less based on 100 parts by mole of an anion repeating unit (*—$CH_2CH(COO^-)$-*) of polyacrylate.

Accordingly, charge and discharge and cycle-life characteristics of a rechargeable lithium battery including the binder composition may be improved.

In addition, the preparation method may provide lithium polyacrylate having a uniform molecular weight distribution. For example, the obtained binder composition may have a polydispersity index (PDI; $M_w/M_n$) ranging from about 1 to about 4, about 1 to about 3.5, about 2 to about 4, or about 2 to about 3.5. In this way, the binder composition including the lithium polyacrylate having a uniform molecular weight distribution has an excellent dispersion, stability, and coating properties. A rechargeable lithium battery including the same shows excellent charge and discharge efficiency, cycle-life characteristic, and the like.

The obtained binder composition may have a turbidity of about 3 NTU to about 20 NTU. For example, the turbidity may be in a range of about 3 NTU to about 15 NTU, about 5 NTU to about 20 NTU, or about 5 NTU to about 15 NTU.

A color value of the binder composition measured according to ASTM D 1209 using a platinum-cobalt color measuring equipment may be about 80 to about 200, and for example, about 80 to about 170, about 80 to about 150, or about 90 to about 150.

In another embodiment of the present invention, provided is a rechargeable lithium battery including an electrode including a current collector and an active material layer positioned on the current collector; and an electrolyte, wherein the active material layer includes an active material and the binder composition described above for a rechargeable lithium battery.

Herein, the binder composition may be included in an amount of about 1 wt % to about 50 wt %, and for example, about 1 wt % to about 40 wt %, about 1 to about 30 wt %, or about 1 wt % to about 20 wt %, based on the total amount of the active material layer.

The active material may include Si, $SiO_x$, a Si—C composite, a Si-Q alloy, graphite, or a combination thereof. Herein, x is (satisfies) 0<x<2, and Q is an alkali metal, an alkaline-earth metal, a Group 13 to 16 element, a transition metal, a rare earth element, or a combination thereof, but not Si.

Specific examples of Q may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

The active material may be, for example, a combination of silicon and graphite. In addition, the active material may be a combination of silicon, silica, and graphite.

When the active material is applied to a rechargeable lithium battery, high-capacity of the rechargeable lithium battery may be realized. However, the active material is about 300% to about 400% times expanded during the charge and discharge cycles and thus, deteriorates the stability or cycle-life characteristics of a battery, but when the active material is used with the binder composition according to one embodiment, the binder may endure the expansion of the active material and play a role of a buffer layer. Accordingly, when the active material and the binder are applied to a rechargeable lithium battery, the rechargeable lithium battery may realize high-capacity and simultaneously show excellent cycle-life characteristics.

The active material layer may further include a conductive material.

The conductive material improves the electrical conductivity of an electrode. Any suitable electrically conductive material may be used as a conductive material, unless it causes a chemical change. Examples of suitable conductive material may be a carbon-based material (such as natural graphite, artificial graphite, carbon black, acetylene black, ketjen black, a carbon fiber, or the like); a metal-based material (such as a metal powder, a metal fiber, or the like of copper, nickel, aluminum, silver, or the like); a conductive polymer (such as a polyphenylene derivative or the like); or a mixture thereof.

The conductive material may be included in an amount of about 0.5 wt % to about 10 wt % based on the total amount of the active material layer. In one embodiment, when the conductive material is included within the range, the electrode shows excellent electrical conductivity, and the expansion of the active material may be effectively controlled.

In one embodiment, the electrode for a rechargeable lithium battery is a negative electrode. When the binder including an acrylate-based compound is applied with a negative active material including silicon (Si) to a negative electrode, excellent effects may be expected.

The current collector may include any suitable material without a particular limit, as long as it does not cause a chemical change to a battery according to the present invention and has high conductivity. The current collector may have a thickness ranging from about 3 µm to about 500 µm but is not particularly limited thereto.

When the current collector is utilized for a negative electrode, it may be a copper foil, a nickel foil, a stainless steel foil, a titanium foil, a nickel foam, a copper foam, a polymer substrate coated with a conductive metal, or a combination thereof.

When the current collector is utilized for a positive electrode, it may be formed of stainless steel, aluminum, nickel, titanium, fired carbon, or aluminum or stainless steel surface-treated with carbon, nickel, titanium, silver, or the like.

FIG. 1 is a schematic view of the rechargeable lithium battery according to one embodiment of the present invention.

Referring to FIG. 1, the rechargeable lithium battery 100 according to one embodiment is a cylindrical battery that includes a negative electrode 112, a positive electrode 114, a separator 113 interposed between the negative electrode 112 and positive electrode 114, an electrolyte (impregnating the negative electrode 112, the positive electrode 114, and the separator 113), a battery case 120, and a sealing member 140 sealing the battery case 120. The rechargeable lithium battery 100 is manufactured by sequentially stacking the negative electrode 112, the separator 113, and the positive electrode 114, and spiral-winding them and housing the wound resultant in the battery case 120.

When the above electrode is used as a negative electrode, the positive electrode may include a compound (lithiated intercalation compound) capable of intercalating and deintercallating lithium as a positive active material.

For example, at least one composite oxide of lithium and a metal (of cobalt, manganese, nickel, or a combination thereof) may be used, and examples thereof may be a compound represented by one of the following Chemical Formulae. $Li_aA_{1-b}R_bD_2$ (0.90≤a≤1.8 and 0≤b≤0.5); $Li_aE_{1-b}R_bO_{2-c}D_c$ (0.90≤a≤1.8, 0≤b≤0.5 and 0≤c≤0.05);

LiE$_{2-b}$R$_b$O$_{4-c}$D$_c$ (0≤b≤0.5, 0≤c≤0.05); Li$_a$Ni$_{1-b-c}$Co$_b$R$_c$D$_\alpha$ (0.90≤a≤1.8, 0≤b≤0.5, 0≤c≤0.05 and 0<α≤2); Li$_a$Ni$_{1-b-c}$Co$_b$R$_c$O$_{2-\alpha}$Z$_\alpha$ (0.90≤a≤1.8, 0≤b≤0.5, 0≤c≤0.05 and 0<α<2); Li$_a$Ni$_{1-b-c}$Co$_b$R$_c$O$_{2-\alpha}$Z$_2$ (0.90≤a≤1.8, 0≤b≤0.5, 0≤c≤0.05 and 0<α<2); Li$_a$Ni$_{1-b-c}$Mn$_b$R$_c$D$_\alpha$ (0.90≤a≤1.8, 0≤b≤0.5, 0≤c≤0.05 and 0<α≤2); Li$_a$Ni$_{1-b-c}$Mn$_b$R$_c$O$_{2-\alpha}$Z$_\alpha$ (0.90≤a≤1.8, 0≤b≤0.5, 0≤c≤0.05 and 0<α<2); Li$_a$Ni$_{1-b-c}$Mn$_b$R$_c$O$_{2-\alpha}$Z$_2$ (0.90≤a≤1.8, 0≤b≤0.5, 0≤c≤0.05 and 0<α<2); Li$_a$Ni$_b$E$_c$G$_d$O$_2$ (0.90≤a≤1.8, 0≤b≤0.9, 0≤c≤0.5 and 0.001≤d≤0.1); Li$_a$Ni$_b$Co$_c$Mn$_d$G$_e$O$_2$ (0.90≤a≤1.8, 0≤b≤0.9, 0≤c≤0.5, 0≤d≤0.5 and 0.001≤e≤0.1); Li$_a$NiG$_b$O$_2$ (0.90≤a≤1.8 and 0.001≤b≤0.1); Li$_a$CoG$_b$O$_2$ (0.90≤a≤1.8 and 0.001≤b≤0.1); Li$_a$MnG$_b$O$_2$ (0.90≤a≤1.8 and 0.001≤b≤0.1); Li$_a$Mn$_2$G$_b$O$_4$ (0.90≤a≤1.8 and 0.001≤b≤0.1); QO$_2$; QS$_2$; LiQS$_2$; V$_2$O$_5$; LiV$_2$O$_5$; LiTO$_2$; LiNiVO$_4$; Li$_{(3-f)}$J$_2$(PO$_4$)$_3$ (0≤f≤2); Li$_{(3-f)}$Fe$_2$(PO$_4$)$_3$ (0≤f≤2); and LiFePO$_4$.

In the above Chemical Formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

Herein, the positive electrode may further include a binder and/or a conductive material. The binder may be the above described binder. Alternatively, the binder may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like, but is not limited thereto.

The conductive material and the current collector are the same as described above.

The negative electrode and the positive electrode may be prepared by mixing each corresponding active material, conductive material, and binder in a solvent to prepare an active material composition, and coating the composition on a current collector. The electrode preparation method is known, and thus is not described in more detail in the present specification.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like, and the ester-based solvent may include methyl acetate, ethyl acetate, n-propyl acetate, dimethacetate, methylpropionate, ethylpropionate, γ-butyrolactone, decanolide, valerolactone, mevalonolactone, caprolactone, or the like. The ether-based solvent may include dibutyl ether, tetraglyme, diglyme, dimethoxyethane, 2-methyltetrahydrofuran, tetrahydrofuran, or the like, and the ketone-based solvent may include cyclohexanone, or the like. The alcohol-based solvent may include ethanol, isopropyl alcohol, or the like. The aprotic solvent may include nitriles (such as those represented by R—CN (wherein R is a C2 to C20 linear, branched, or cyclic hydrocarbon group, and may include a double bond, an aromatic ring, or an ether bond)), amides (such as dimethylformamide), dioxolanes (such as 1,3-dioxolane, sulfolanes), or the like.

The non-aqueous organic solvent may be used singularly or in a mixture. When the organic solvent is used in a mixture, the mixing ratio may be controlled in accordance with a desirable cell performance.

The carbonate-based solvent may be prepared by mixing a cyclic carbonate and a linear carbonate. The cyclic carbonate and the linear carbonate may be mixed together in the volume ratio of about 1:1 to about 1:9. In one embodiment, when the cyclic carbonate and the linear carbonate are mixed together within this range, performance of electrolyte is improved.

The non-aqueous organic solvent according to one embodiment of the present invention includes an aromatic hydrocarbon-based organic solvent as well as the carbonate based solvent. The carbonate-based and the aromatic hydrocarbon-based solvents may be mixed together in a volume ratio ranging from about 1:1 to about 30:1.

The aromatic hydrocarbon-based organic solvent may be an aromatic hydrocarbon-based compound represented by the following Chemical Formula A.

Chemical Formula A

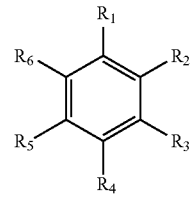

In the above Chemical Formula A, R$_1$ to R$_6$ are each independently hydrogen, a halogen atom, a C1 to C10 alkyl group, a C1 to C10 haloalkyl group, or a combination thereof.

The aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may further include vinylene carbonate or an ethylene carbonate-based compound represented by the following Chemical Formula B in order to improve cycle-life of a battery.

Chemical Formula B

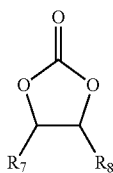

In the above Chemical Formula B, $R_7$ and $R_8$ are each independently, hydrogen, a halogen atom, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the vinylene carbonate or the ethylene carbonate-based compound used to improve cycle life may be adjusted within an appropriate range.

The lithium salt is dissolved in the non-aqueous solvent and supplies lithium ions in a rechargeable lithium battery, and basically operates the rechargeable lithium battery and improves lithium ion transfer between the positive and negative electrodes. The lithium salt may include at least one supporting salt selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers), LiCl, LiI, $LiB(C_2O_4)_2$ (lithium bis(oxalato) borate, LiBOB), or a combination thereof. The lithium salt may be used in a concentration of about 0.1 M to about 2.0 M. In one embodiment, when the lithium salt is included at the above concentration range, an electrolyte has excellent performance and lithium ion mobility due to desired electrolyte conductivity and viscosity.

The battery may further include a separator. The separator may include any suitable material commonly used in the conventional lithium battery as long as it is capable of separating the negative electrode from the positive electrode and providing a transporting passage for lithium ion. In other words, the separator may have a low resistance to ion transportation and an excellent impregnation for an electrolyte solution. For example, it may be selected from a glass fiber, polyester, polyethylene, polypropylene, polytetrafluoroethylene (PTFE), or a combination thereof. It may have a form of a non-woven fabric or a woven fabric. For example, a polyolefin-based polymer separator such as polyethylene, polypropylene or the like is mainly used for a lithium ion battery. In order to ensure the heat resistance or mechanical strength, a coated separator including a ceramic component or a polymer material may be used. Selectively, it may have a mono-layered (single-layered) or multi-layered structure.

Hereinafter, examples according to embodiments of the present invention and comparative examples are described. These examples, however, should not in any sense be interpreted as limiting the scope of the present invention.

Example 1

(Preparation of Binder)

A solution prepared by dissolving 35 g of lithium hydroxide (LiOH) in 200 g of deionized water was slowly agitated and added to 100 g of acrylic acid to prepare a mixed aqueous solution. 300 g of deionized water was injected into a 2 L reaction vessel having a heater, a cooler, and an agitator and then, heated up to 80° C. After a solution prepared by dissolving 0.2 g of ammoniumpersulfate in 10 g of deionized water was injected into the reaction vessel and then, maintained for 10 minutes, the mixed aqueous solution of the acrylic acid and lithium hydroxide, and an aqueous solution prepared by dissolving 0.3 g of ammonium persulfate in 20 g of deionized water were simultaneously added thereto in a dropwise fashion. The mixture was maintained and reacted for one hour, obtaining a binder (ALPA) composition having a pH of 8.0 and a viscosity of 760 cps at 25° C. The binder composition included lithium polyacrylate and water as a solvent and was a liquid type. In this way, the lithium substitution ratio of polyacrylate was 100% so that the binder composition did not include polyacrylate without lithium substitution.

A solid content, i.e., lithium polyacrylate of the obtained binder composition was measured by drying the binder composition at 150° C. for 1 hour, and the results are 18.4 wt %. Hereinafter, the binder composition in the form of the liquid type was used during the negative electrode preparation.

(Manufacture of Negative Electrode)

Negative active material slurry was prepared by mixing a negative active material (80 wt % of Si-Alloy made by 3M and 10 wt % of SFG6 sheet-shaped graphite), 8 wt % of the binder composition prepared above, and 2 wt % of conductive material carbon black (KB 603) and adding water thereto.

The negative active material slurry was coated on a copper foil, dried at 110° C. to evaporate water, and compressed to prepare a negative electrode.

The negative electrode was loaded in a level of 3.8 mg/cm$^2$ and had an active mass density of 1.5 g/cc.

(Manufacture of Rechargeable Lithium Battery Cell (Half-Cell))

A rechargeable lithium battery cell was manufactured by using the negative electrode prepared above, a polypropylene separator, a lithium metal as a counter electrode, and an electrolyte solution prepared by adding $LiPF_6$ in a concentration of 1.5 mol/L in a solvent obtained by mixing ethylene carbonate (EC):diethyl carbonate (DEC):fluoro ethylene carbonate (FEC) in a volume ratio of 5:70:25.

Comparative Example 1

A binder composition including 8 wt % of lithium polyacrylate (LiPAA) and water made by Aldrich Corporation and having properties listed in the following Table 1 was used as a binder to manufacture a rechargeable lithium battery cell according to the same method as Example 1.

Comparative Example 2

A rechargeable lithium battery cell was manufactured according to the same method as Example 1 except for using 4 wt % of a styrene-butadiene rubber (SBR) and 4 wt % of a carboxylmethyl cellulose (CMC) as a binder.

Comparative Example 3

A rechargeable lithium battery cell was manufactured according to the same method as Example 1 except for using 8 wt % of polyamideimide (PAI) as a binder.

Comparative Example 4

A rechargeable lithium battery cell was manufactured according to the same method as Example 1 except for using 1.5 wt % of a styrene-butadiene rubber (SBR) and 1.5 wt % of carboxylmethyl cellulose (CMC) as a binder.

Comparative Example 5

A rechargeable lithium battery cell was manufactured according to the same method as Example 1 except that the binder was prepared by injecting lithium hydroxide after a polymer synthesis during a process of preparing the binder composition.

Specifically, 300 g of deionized water was put in a 2 L reaction vessel having a heater, a cooler, and an agitator and heated up to 80° C. A solution prepared by dissolving 0.2 g of ammonium persulfate in 10 g of deionized water was injected into the reaction vessel and maintained for 10 minutes, and a mixed aqueous solution of 150 g of acrylic acid and 400 g of deionized water and an aqueous solution obtained by dissolving 0.3 g of ammoniumpersulfate in 20 g of deionized water were simultaneously (or concurrently) added thereto in a dropwise fashion for 3 hours. The mixture was maintained and reacted for 1 hour and cooled down to less than or equal to 40° C., and a solution prepared by dissolving 53 g of lithium hydroxide (LiOH) in 800 g of deionized water was slowly agitated and added thereto, obtaining a final binder composition.

The $M_n$ and $M_w$ were measured by using (i.e., utilizing) a Waters GPC system (Column: 2× TSKgel, GMPWxl 7.8× 300 mm) and utilizing polyethylene glycol/polyethylene oxide as a standard sample.

The turbidity was measured by using a TB1000 turbidimeter made by EUTECH Instruments.

The color value was measured by using a platinum-cobalt color measuring equipment with a reference to ASTM D 1209.

Evaluation Example 1: Initial Efficiency

The rechargeable lithium battery cells according to the Examples and Comparative Examples were charged and discharged at 0.1 C, charge capacity and discharge capacity of the rechargeable lithium battery cells were measured, a ratio of the discharge capacity relative to the charge capacity was calculated, and the results are provided in the following Table 2.

Evaluation Example 2: Cycle-Life Characteristics

The rechargeable lithium battery cells according to the Examples and Comparative Examples were measured for a capacity ratio of the 100th cycle relative to the 1st cycle under a 1 C condition, and the results are provided in the following Table 2.

TABLE 2

| | | Example 1 | Comparatvie Example 1 | Comparative Example 2 | Comparative Example 3 | Comparative Example 4 |
|---|---|---|---|---|---|---|
| Active material | Alloy | 80 | 80 | 80 | 80 | 82.5 |
| | Graphite | 10 | 10 | 10 | 10 | 12.5 |
| Conductive material | KB | 2 | 2 | 2 | 2 | 2 |
| Binder | ALPA | 8 | | | | |
| | LiPAA | | 8 | | | |
| | SBR | | | 4 | | 1.5 |
| | CMC | | | 4 | | 1.5 |
| | PAI | | | | 8 | |
| Initial efficiency | | 88 | 86 | — | 82 | — |
| Retention @100 | | 87 | 85 | — | 81 | — |

The following Table 1 shows properties of the binder compositions according to Example 1 and Comparative Examples 1 and 5.

TABLE 1

| | Example 1 | Comparative Example 1 | Comparative Example 5 |
|---|---|---|---|
| Solid content (%) | 18.4 | 7.0 | 10.2 |
| pH | 8.0 | 8.1 | 8.0 |
| Viscosity (cps) | 760 | 4,600 | 7,800 |
| Turbidity (NTU) | 11.6 | — | 8.5 |
| Color value | 147 | — | 75 |
| Number average molecular weight ($M_n$) | 44,085 | 57,494 | 48,030 |
| Weight average molecular weight ($M_w$) | 130,696 | 292,424 | 254,559 |
| $M_w/M_n$ | 2.97 | 5.09 | 5.30 |

In the Table 1, the properties of the lithium polyacrylate binders were measured as follows:

The viscosity was measured by using a Brookfield viscometer and setting a spindle at #3 at a speed of 60 rpm.

In Table 2, each component was used in a unit of wt %.

Referring to Table 2, the rechargeable lithium battery cells according to Comparative Example 2 and 4 showed almost no active cell performance, while the rechargeable lithium battery cells according to Example 1 showed remarkably excellent initial efficiency and cycle-life characteristics compared with the rechargeable lithium battery cells according to the Comparative Examples.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims, and equivalents thereof. Therefore, the aforementioned embodiments should be understood to be examples but not limiting the scope of the present invention in any way.

What is claimed is:

1. A binder composition for a rechargeable lithium battery, comprising:
   lithium polyacrylate and 70 wt % to 85 wt % of a solvent, the binder composition having a viscosity of about 600 cps to about 2000 cps, a solid content of about 15 wt % to about 30 wt %, and a content of the lithium polyacrylate being about 15 wt % to about 30 wt %.

2. The binder composition for the rechargeable lithium battery of claim 1, wherein the content of the lithium polyacrylate is about 15% to about 20%.

3. The binder composition for the rechargeable lithium battery of claim 1, wherein a polydispersity index $M_w/M_n$ of the binder composition is about 1 to about 4.

4. The binder composition for the rechargeable lithium battery of claim 1, wherein the binder composition has a pH of about 6 to about 8.5.

5. The binder composition for the rechargeable lithium battery of claim 1, wherein the binder composition has a turbidity of about 3 NTU to about 20 NTU.

6. The binder composition for the rechargeable lithium battery of claim 1, wherein a color value of the binder composition measured according to ASTM D 1209 utilizing a platinum-cobalt color measuring equipment is about 80 to about 200.

7. A rechargeable lithium battery, comprising:
an electrode comprising a current collector and an active material layer on the current collector; and
an electrolyte,
wherein the active material layer comprises a dried active material slurry, the active material slurry comprising an active material and the binder composition of claim 1.

8. The rechargeable lithium battery of claim 7, wherein the active material comprises Si, $SiO_x$, a Si—C composite, a Si-Q alloy, graphite, or a combination thereof,
wherein, x is 0<x<2, and Q is an alkali metal, an alkaline-earth metal, a Group 13 to 16 element, a transition metal, a rare earth element, or a combination thereof, but not Si.

9. The rechargeable lithium battery of claim 7, wherein the binder composition is included in an amount of about 1 wt % to about 50 wt % based on a total amount of the active material layer.

* * * * *